United States Patent
Takenaka et al.

(10) Patent No.: US 10,814,573 B2
(45) Date of Patent: Oct. 27, 2020

(54) BEAD RING DESIGN IMPROVEMENT

(71) Applicant: Bridgestone Americas Tire Operations, LLC, Nashville, TN (US)

(72) Inventors: Hugo K. Takenaka, Wadsworth, OH (US); Jamie M. Young, Wadsworth, OH (US); Neal G. Sehm, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 16/631,299

(22) PCT Filed: Jul. 2, 2018

(86) PCT No.: PCT/US2018/040601
§ 371 (c)(1),
(2) Date: Jan. 15, 2020

(87) PCT Pub. No.: WO2019/018126
PCT Pub. Date: Jan. 24, 2019

(65) Prior Publication Data
US 2020/0207043 A1    Jul. 2, 2020

Related U.S. Application Data

(60) Provisional application No. 62/535,012, filed on Jul. 20, 2017.

(51) Int. Cl.
*B29D 30/06* (2006.01)
*B29D 30/72* (2006.01)

(52) U.S. Cl.
CPC ......... *B29D 30/0606* (2013.01); *B29D 30/72* (2013.01); *B29D 2030/062* (2013.01); *B29D 2030/0617* (2013.01)

(58) Field of Classification Search
CPC ............ B29D 30/0606; B29D 30/0662; B29D 2030/0617; B29D 2030/062
See application file for complete search history.

(56) References Cited

U.S. PATENT DOCUMENTS 2,025,992 A * 12/1935 Laursen ............. B29D 30/0602
264/326
3,278,990 A * 10/1966 Joseph ............... B29D 30/0662
425/43

(Continued)

FOREIGN PATENT DOCUMENTS

CN    105150427    12/2015
CN    205201885    5/2016
(Continued)

OTHER PUBLICATIONS

International Search Report and Written Opinion of the International Searching Authority; Corresponding PCT Application Serial No. PCT/US2018/040601; Authorized Officer Kwon, Yong Kyong; Nov. 15, 2018.

*Primary Examiner* — James P Mackey
(74) *Attorney, Agent, or Firm* — Shaun J. Fox; Bryan J. Jaketic (57) ABSTRACT

A bead ring for a tire mold includes a plurality of concentric rings, wherein at least two adjacent concentric rings form an interface having a circumferential seam. The circumferential seam is configured to receive airflow from an interior of the tire mold, and the circumferential seam is in fluid communication with an air chamber located radially exterior of the circumferential seam.

18 Claims, 7 Drawing Sheets

(56) References Cited

U.S. PATENT DOCUMENTS

| | | | |
|---|---|---|---|
| 3,467,989 A | * | 9/1969 | Youngblood et al. ........................ B29D 30/0606 425/36 |
| 4,257,154 A | | 3/1981 | Fuller |
| 4,481,997 A | | 11/1984 | Strader |
| 5,078,584 A | * | 1/1992 | Drewel et al. ..... B29D 30/0602 425/28.1 |
| 5,800,642 A | | 9/1998 | Ohya |
| 6,398,533 B1 | | 6/2002 | Hanya et al. |
| 6,402,489 B1 | | 6/2002 | Dyer |
| 6,923,629 B2 | | 8/2005 | Ahn et al. |
| 7,290,996 B2 | | 11/2007 | Tanaka |
| 7,530,803 B2 | | 5/2009 | Seroka |
| 7,896,643 B2 | | 3/2011 | Serener-Theilmann |
| 8,186,984 B2 | | 5/2012 | Cuny et al. |
| 8,757,995 B2 | | 6/2014 | Kohara |
| 8,876,507 B2 | | 11/2014 | Hakoshima |
| 2007/0278707 A1 | | 12/2007 | Koberlein |

FOREIGN PATENT DOCUMENTS

| | | | |
|---|---|---|---|
| JP | 6-234124 | * | 8/1994 |
| JP | 11-138547 | * | 5/1999 |
| JP | 2008-037053 | | 2/2008 |
| JP | 2011-016327 | | 1/2011 |
| JP | 2012-161939 | | 8/2012 |
| WO | 1988001927 | | 3/1988 |

* cited by examiner

BEAD RING DESIGN IMPROVEMENT

FIELD OF INVENTION

The present disclosure is directed to a bead ring for tire molds. More particularly, the present disclosure is directed to a bead ring for tire molds comprising a plurality of concentric bead rings.

BACKGROUND

Tire molds receive green tires, which are expanded and cured inside of the tire mold to form a vulcanized tire. During this process the tire rubber is pressed into the tire mold, forcing air out of the tire mold. The tire mold may be made of a plurality of rings that form the tire, including a bead ring that shapes the bead region of the tire.

Known bead rings include a plurality of micro vents drilled into a bead heel area, to allow air to escape during the tire curing and molding process. Such vents can create sprues on a vulcanized tire. Sprues in the bead area of a tire may adversely affect bead seating on the wheel. Thus, there is a need for eliminating vent sprues and enhancing bead seating on a wheel.

SUMMARY OF THE INVENTION

In one embodiment, a tire mold comprises a tread ring having tread forming elements disposed thereon, two sidewall plates adjacent to the tread ring, and a plurality of concentric bead rings. At least two adjacent concentric bead rings form a bead ring interface having a circumferential seam, wherein the circumferential seam is configured to receive airflow from an interior of the tire mold. One of the concentric bead rings is adjacent to one of the sidewall plates. The tire mold further includes an air chamber located radially outside of the circumferential seam and fluidly connected to the circumferential seam.

The plurality of concentric bead rings may include two concentric bead rings, and one of the concentric bead rings may be made up of a plurality of adjacent radial sections. The radial sections may have partially sinusoidal ends that intermesh with the partially sinusoidal ends of adjacent radial sections. The radial sections may form radial seams that permit the passage of air but prevent the passage of rubber. The plurality of concentric bead rings may include at least two concentric bead rings. The tire mold may include an outflow passageway connecting the air chamber to an exterior of the tire mold, and permit fluid communication from the air chamber to the exterior of the tire mold. The plurality of concentric bead rings may include at least three concentric bead rings. The circumferential seam may be sized to permit the passage of air but prevent the passage of rubber. At least one circumferential seam may extend in an axial direction away from the bead region of the tire mold. Further, the plurality of concentric rings may be 3 concentric rings.

In another embodiment, a bead ring for a tire mold comprises a plurality of concentric rings wherein at least two adjacent concentric rings form an interface having a circumferential seam, and the circumferential seam is configured to receive airflow from an interior of the tire mold. The tire mold further includes an air chamber located radially outside of a circumferential seam and fluidly connected to the circumferential seam. At least one of the concentric rings may be broken into a plurality of radial sections. An output channel may extend from the air chamber to an external atmosphere. At least one circumferential seam may extend in an axial direction away from the bead region of the tire mold. At least one circumferential seam may extend in a radial direction away from a bead region of the tire mold. The circumferential seam may be sized to permit the passage of air but prevent the passage of rubber.

In yet another embodiment, a tire mold comprises a tread ring, two sidewall plates, and two bead rings formed by a plurality of concentric rings. The concentric rings of each bead ring are adjacent to one another, and adjacent concentric bead rings form an interface having a circumferential seam. Each circumferential seam provides a path to vent air from an interior of the tire mold to an exterior of the tire mold, and the circumferential seam is sized to permit the passage of air but prevent the passage of rubber. An air chamber is located radially outside of a circumferential seam and fluidly connected to the circumferential seam.

The tire mold of this embodiment may further include a scribed circumferential seam. At least one of the concentric bead rings may include a plurality of radial sections. The plurality of radial sections may form radial seams sized to permit the passage of air but prevent the passage of rubber.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. It should also be understood that steps in a method shown as a single step may be replaced with multiple steps, steps shown as multiple steps may be replaced with a single step, and the ordering of certain steps may be varied without altering the method. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Bead" refers to the part of the tire that contacts the wheel and defines a boundary of the sidewall, for a tire that is formed by a tire mold of the present disclosure.

"Circumferential" and "circumferentially" refer to a direction extending along the perimeter of the surface of the tread perpendicular to the axial direction of a tire that is formed by a tire mold of the present disclosure.

"Radial" and "radially" refer to a direction perpendicular to the axis of rotation of a tire that is formed by a tire mold of the present disclosure.

"Sidewall" refers to that portion of the tire between the tread and the bead of a tire that is formed by a tire mold of the present disclosure.

"Tread" refers to that portion of the tire that comes into contact with the road under normal inflation and load of a tire that is formed by a tire mold of the present disclosure.

While similar terms used in the following descriptions describe similar components and steps, it is understood that because the terms carry slightly different connotations, one of ordinary skill in the art would not consider any one of the following terms to be purely interchangeable with another term used to describe a similar component or step.

Figure 1:
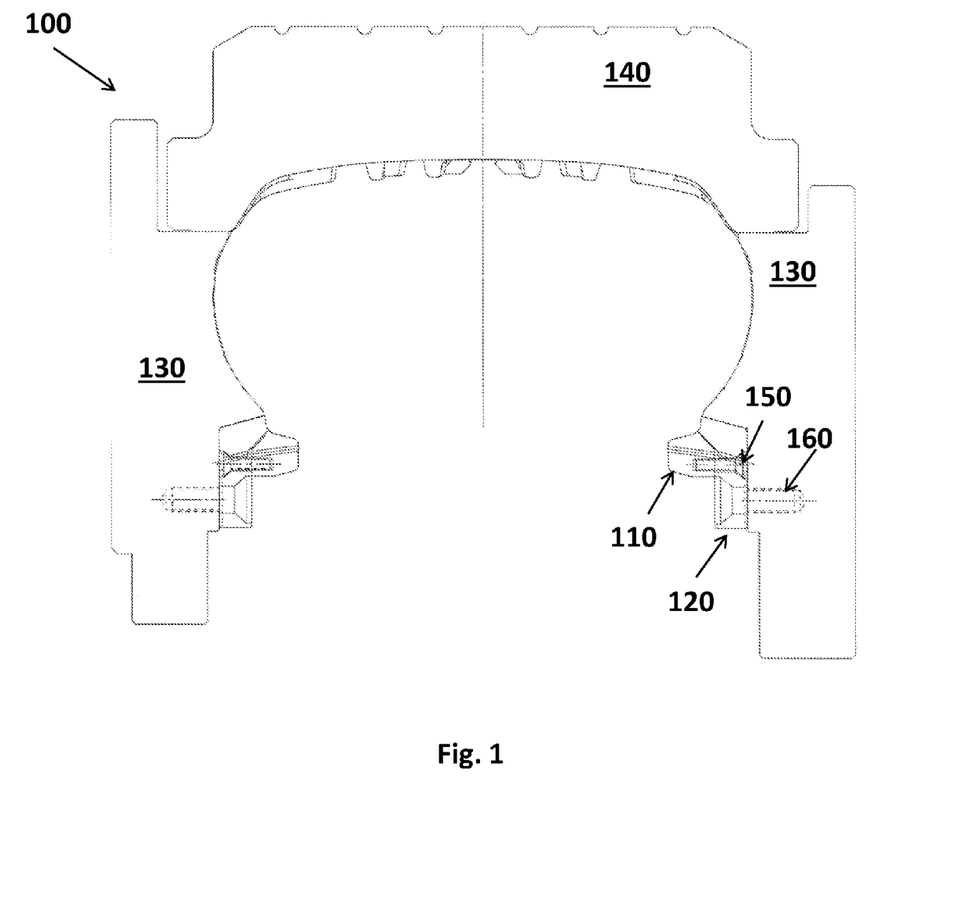
FIG. 1 is a section view of a tire mold according to one embodiment.

FIG. 1 depicts a cross section of a tire mold 100 having bead rings 110, 120, sidewall plates 130, and a tread ring 140. Bead rings each include a first concentric ring 110 and a second concentric ring 120 adjacent to the first concentric ring 120. Bead bolts 150 fix the first concentric rings 110 to the second concentric rings 120, and sidewall bolts 160 fix the second concentric rings 120 to the sidewall plates 130. Tread ring 140 has an interior surface that defines a tread portion a tire during the curing process, sidewall plates 130 have interior surfaces that define sidewall portions of a tire during the curing process, and bead rings 120 have interior surfaces that define bead portions of a tire during the curing process. In an alternative embodiment (not shown), sidewall rings are used instead of sidewall plates.

Figure 2:
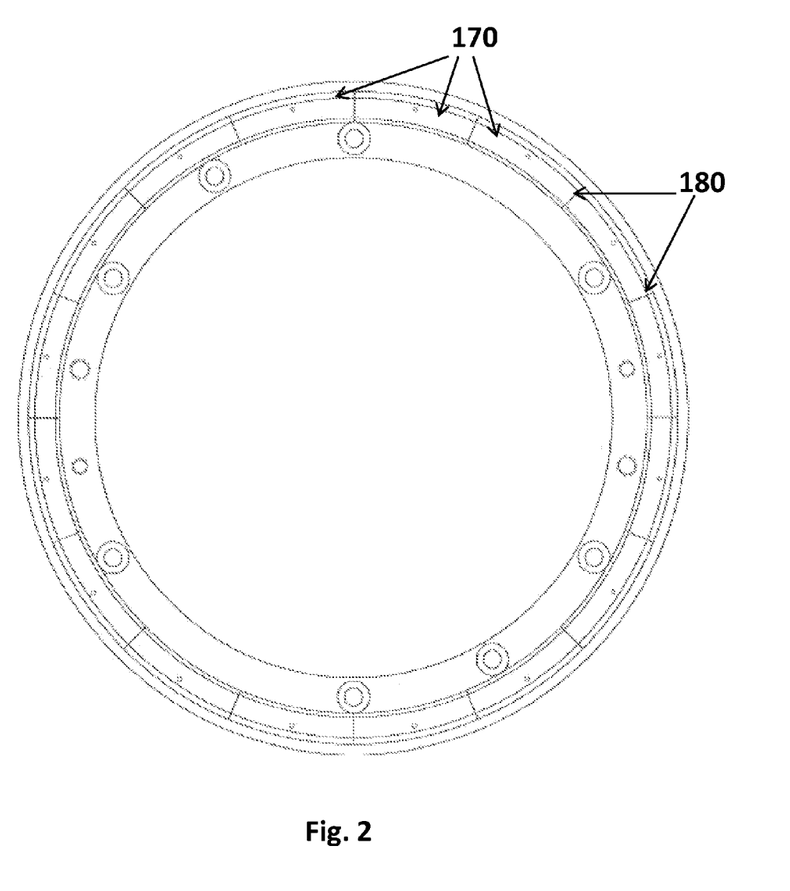
FIG. 2 is a side view of the bead ring having radial sections according to the embodiment of FIG. 1.

FIG. 2 shows an interior side view of the first and second concentric rings 110, 120. In this embodiment, the first concentric ring 110 is divided into a plurality of radial sections 170 that each have two ends. In this embodiment, ends are substantially planar surfaces. When the sections are assembled in the manner shown, each end abuts an end of an adjacent radial section 170, and adjacent ends form radial seams 180 that extend linearly. The radial seams 180 facilitate fitting the radial sections 170 together, and further provide a means to facilitate airflow from an interior of the tire mold to outside of the tire mold.

In alternative embodiments (not shown), the radial section ends could take alternative shapes from the perspective shown in FIG. 1, for example sinusoidal, serpentine, or jagged ends, to facilitate airflow. In other alternative embodiments (not shown), the second concentric ring could also be divided into radial sections.

Figure 3A:
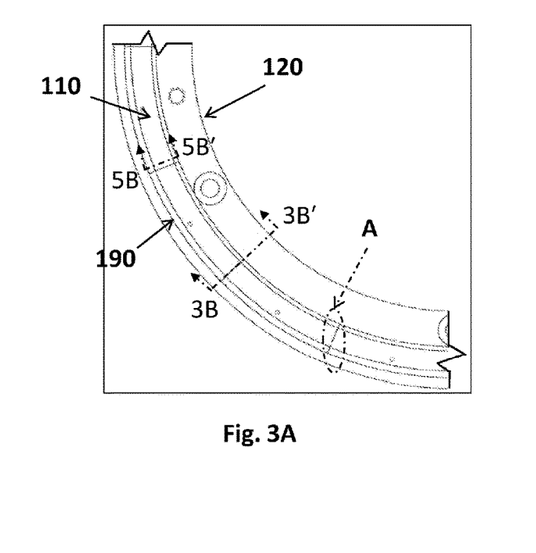
FIG. 3A is a side view of a section of the bead ring according to the embodiment of FIG. 1.
Figure 3B:
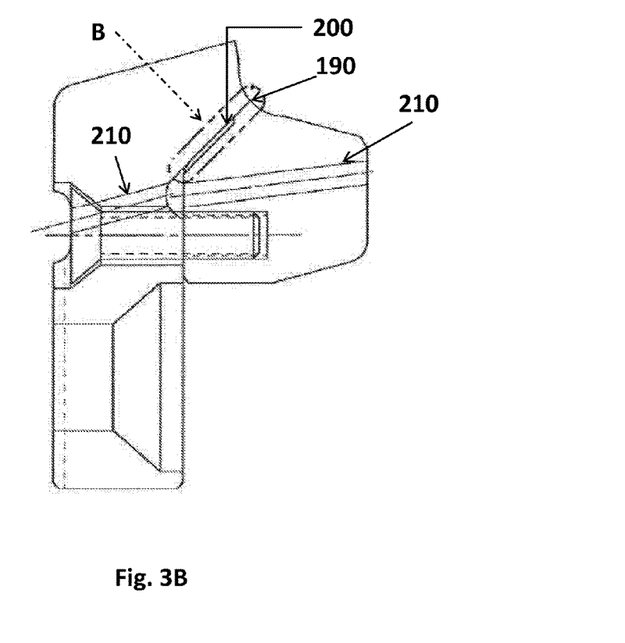
FIG. 3B is a section view along line 3B-3B' of FIG. 3A.

FIG. 3A illustrates a section of the bead rings 110, 120, and FIG. 3B illustrates a cross section view of the bead rings 110, 120 along line 3B-3B' of FIG. 3A. As seen in FIG. 3B, the first concentric ring 110 and second concentric ring 120 form a circumferential seam 190 at the interface of the two concentric rings. The circumferential seam 190 is sized large enough so that air may flow into the circumferential seam 190 from an interior of the tire mold, but small enough so that rubber may not flow into the circumferential seam 190. The circumferential seam depth can range from 0.0015-0.0025 inches (0.038-0.065 mm). An air chamber 200 is located at the interior end of the circumferential seam 190, to improve the airflow received from the circumferential seam 190. In general, the airflow from an interior of tire mold to the air chamber is improved the closer that the air chamber is located to the inner surface of the tire mold. The air chamber further includes two outflow passageways 210 that lead from the air chamber to the atmosphere outside of tire mold. Outflow passageways have a relatively large cross sectional area (in an airflow direction) so that the air can easily flow out of air chambers to the external atmosphere. The outflow passageways permit a greater airflow than circumferential seams 190, so that air chambers do not become pressurized. In this embodiment, the airflow has two outflow passageways, but in other embodiments could have greater or fewer.

In alternative embodiments (not shown), the air chamber can extend all the way to the atmosphere external to the tire mold, eliminating the need for the outflow passageways. In other alternative embodiments (not shown), the circumferential seams could be scribed in additional places in the concentric rings to permit a greater airflow from an interior of the tire mold.

Figure 4:
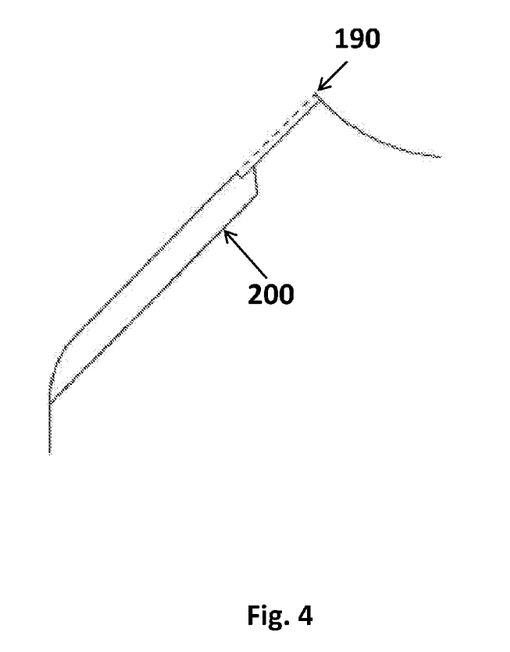
FIG. 4 is a detail view of the air chamber seen in FIG. 3B.

FIG. 4 illustrates a detailed section view of a portion of the interface between first and second concentric rings, indicated by the dashed oval B in FIG. 3B. As seen in FIG. 4, an air gap is designed to receive airflow from the circumferential seam 190, and outputs airflow through the output passageway.

Figure 5A:
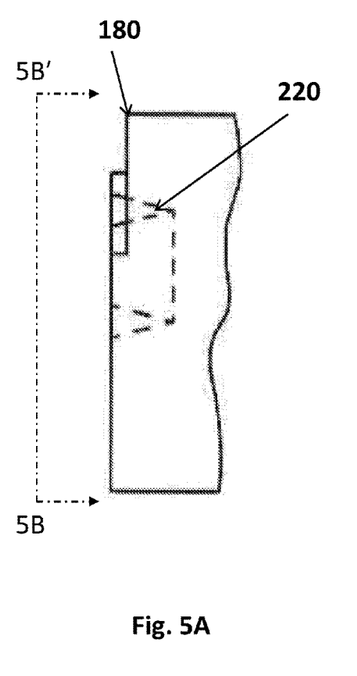
FIG. 5A is a section view of a radial section according to the embodiment of FIG. 1.
Figure 5B:
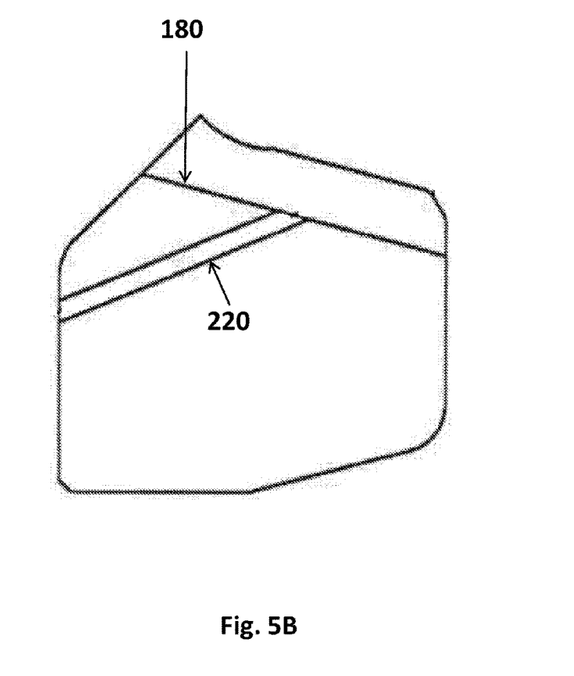
FIG. 5B is a section view of the radial section shown in FIG. 5A, along the line 5B-5B'.

FIG. 5A illustrates a detailed section view of an interface between radial sections 170 of the first concentric ring 110, indicated by the dashed circle A of FIG. 3A. FIG. 5B is a side view of the radial section shown in 5A, along the line 5B-5B'. A radial seam 180 is formed at the interface, and includes a channel 220 (shown in dashed lines) leading from the radial seam 180 to outside of the tire mold. In the embodiment of FIG. 5A, an adjacent radial section 170 would include a protrusion to fit in a locking-type engagement with the radial section shown, to form the radial seam 180. In this way, the radial seam 180 is sized and shaped to permit airflow, but to prevent rubber from entering into the radial seam 180.

Figure 6:
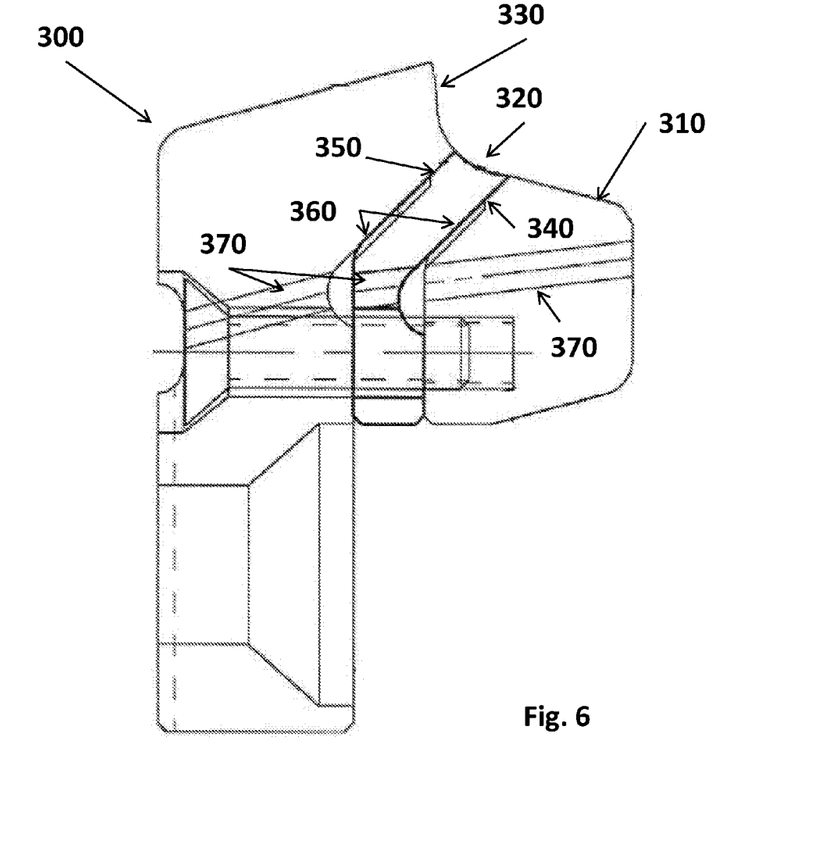
FIG. 6 is a section view of an alternative embodiment of a bead ring, having three concentric rings.

FIG. 6 depicts an alternative embodiment where three concentric rings are used to form a bead ring 300 of a tire mold. In this embodiment, first concentric ring 310 is located at an innermost position, a second concentric ring 320 is located at an intermediate position, and a third concentric ring 330 is located at an outermost position. In this embodiment, two circumferential seams are formed, one circumferential seam 340 between the first and second concentric rings 310, 320, and another circumferential seam 350 between the second and third concentric rings 320, 330. Each circumferential seam includes an air chamber 360 that receives an airflow from the circumferential seam, and each air chamber 360 includes one or more outflow passageways 370 to guide air from the air chamber 360 to an exterior of the tire mold.

In alternative embodiments (not shown), more than three bead rings can be used to form the bead section of a tire mold, for example four or five bead rings of various cross sections may be used.

Figure 7:
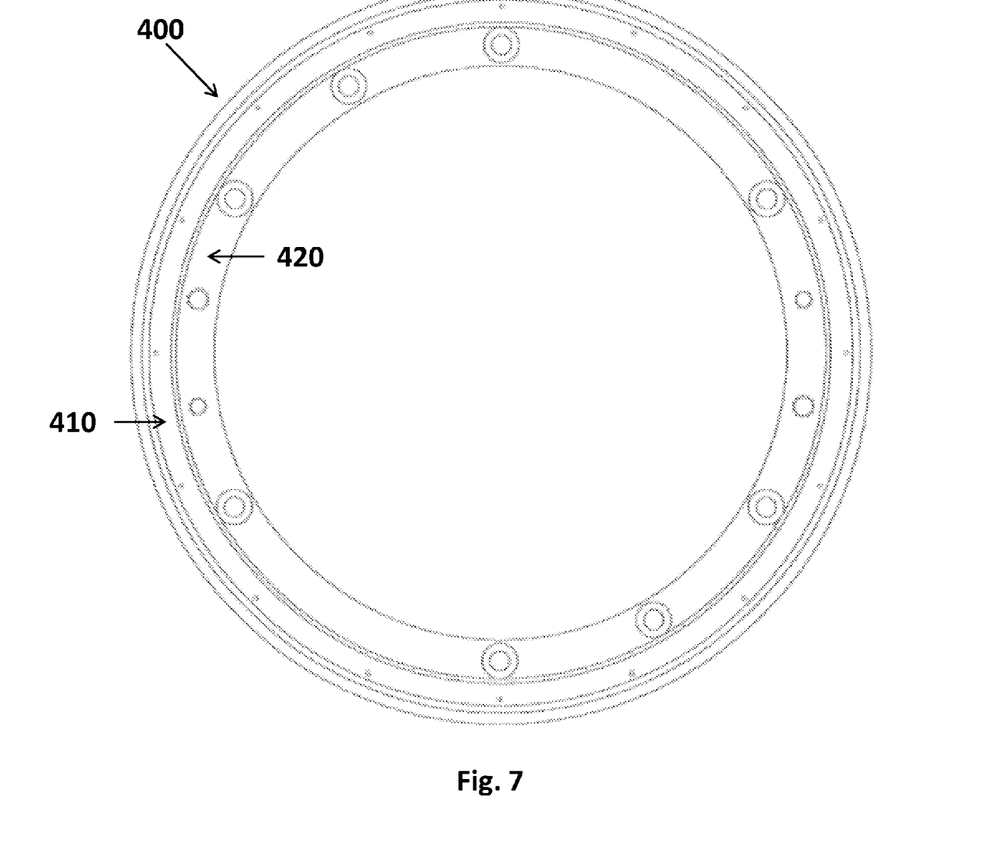
FIG. 7 is a side view of an alternative embodiment of a bead ring, having two concentric rings that are not split into radial sections.

FIG. 7 depicts an alternative embodiment of the first and second bead rings, where the bead ring 400 is comprised of a continuous inner ring 410 and a continuous outer ring 420, and not broken into radial sections, and do not include radial seams. The first and second bead rings 410, 420 in this embodiment are otherwise similar to the first and second bead rings 410, 420 discussed above.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire mold, comprising:
a tread ring having tread forming elements disposed thereon;
two sidewall members adjacent to the tread ring, wherein the sidewall members are selected from the group consisting of plates and rings;
a plurality of concentric bead rings,
wherein at least two adjacent concentric bead rings form a bead ring interface having a circumferential seam,
wherein the circumferential seam is configured to receive airflow from an interior of the tire mold,
wherein one of the concentric bead rings is adjacent to one of the sidewall members,
wherein one of the concentric bead rings is made up of a plurality of adjacent radial sections, and
wherein the radial sections have partially sinusoidal ends that intermesh with the partially sinusoidal ends of adjacent radial sections; and
an air chamber located radially outside of the circumferential seam and fluidly connected to the circumferential seam.

2. The tire mold of claim 1, wherein the radial sections form radial seams that permit the passage of air but prevent the passage of rubber.

3. The tire mold of claim 1, wherein the plurality of concentric bead rings includes at least two concentric bead rings.

4. The tire mold of claim 1, further including an outflow passageway connecting the air chamber to an exterior of the tire mold, and permitting fluid communication from the air chamber to the exterior of the tire mold.

5. The tire mold of claim 1, wherein the plurality of concentric bead rings includes at least three concentric bead rings.

6. The tire mold of claim 1, wherein the circumferential seam is sized to permit the passage of air but prevent the passage of rubber.

7. The tire mold of claim 1, wherein the circumferential seam extends in an axial direction away from a bead region of the tire mold.

8. A bead ring for a tire mold, comprising:
a plurality of concentric rings,
wherein at least two adjacent concentric rings form an interface having a circumferential seam,
wherein the circumferential seam is configured to receive airflow from an interior of the tire mold,
wherein one of the concentric rings is made up of a plurality of adjacent radial sections, and
wherein the radial sections have serpentine ends that intermesh with the serpentine ends of adjacent radial sections; and
an air chamber located radially outside of the circumferential seam and fluidly connected to the circumferential seam.

9. The bead ring of claim 8, wherein the plurality of concentric rings is at least 3 concentric rings.

10. The bead ring of claim 8, wherein at least one of the concentric rings is broken into a plurality of radial sections.

11. The bead ring of claim 8, further including an output channel extending from the air chamber to an external atmosphere.

12. The bead ring of claim 8, wherein the circumferential seam extends in an axial direction away from a bead region of the tire mold.

13. The bead ring of claim 12, wherein the circumferential seam extends in a radial direction away from a bead region of the tire mold.

14. The bead ring of claim 8, wherein the circumferential seam is sized to permit the passage of air but prevent the passage of rubber.

15. The bead ring of claim 8, wherein the serpentine ends of the radial sections are partially sinusoidal ends.

16. A tire mold, comprising:
a tread ring;
two sidewall members, wherein the members are selected from the group consisting of plates and rings;
two bead rings formed by a plurality of concentric rings,
wherein the concentric rings of each bead ring are adjacent to one another,
wherein adjacent concentric rings form an interface having a circumferential seam,
wherein each circumferential seam provides a path to vent air from an interior of the tire mold to an exterior of the tire mold,
wherein the circumferential seam is sized to permit the passage of air but prevent the passage of rubber,
wherein one of the concentric rings is made up of a plurality of adjacent radial sections, and
wherein the radial sections have serpentine ends that intermesh with the serpentine ends of adjacent radial sections; and
an air chamber located radially outside of the circumferential seam and fluidly connected to the circumferential seam.

17. The tire mold of claim 16, wherein the circumferential seam is scribed.

18. The tire mold of claim 16, wherein the serpentine ends of the radial sections are partially sinusoidal ends.

* * * * *